United States Patent
Tsiarkezos et al.

(10) Patent No.: US 6,821,601 B2
(45) Date of Patent: Nov. 23, 2004

(54) STITCHBONDED FABRIC AND PROCESS FOR MAKING SAME

(75) Inventors: Stephen Horace Tsiarkezos, Elkton, MD (US); Nicholas James Brownless, Mansfield (GB)

(73) Assignee: Xymid, L.L.C., Chesterfield, VA (US)

( * ) Notice: Subject to any disclaimer, the term of this patent is extended or adjusted under 35 U.S.C. 154(b) by 0 days.

(21) Appl. No.: 09/903,805

(22) Filed: Jul. 12, 2001

(65) Prior Publication Data

US 2003/0021947 A1 Jan. 30, 2003

(51) Int. Cl.$^7$ .................................................. B32B 3/06
(52) U.S. Cl. ....................... 428/102; 428/104; 428/113; 428/544; 428/549; 428/594; 428/605; 428/606; 428/607; 428/608; 442/402; 442/394; 442/378
(58) Field of Search .................................. 442/402, 394, 442/378; 428/102, 104, 113, 549, 544, 594, 605, 606, 607, 608

(56) References Cited

U.S. PATENT DOCUMENTS

| | | | |
|---|---|---|---|
| 4,704,321 A | 11/1987 | Zafiroglu | 428/230 |
| 4,737,394 A | 4/1988 | Zafiroglu | 428/102 |
| 4,773,238 A | 9/1988 | Zafiroglu | 66/192 |
| 4,876,128 A | 10/1989 | Zafiroglu | 428/102 |
| 5,038,693 A | * 8/1991 | Kourtides et al. | 112/440 |
| 5,436,075 A | * 7/1995 | Sawko | 428/375 |
| 5,879,779 A | * 3/1999 | Zafiroglu | 428/102 |

* cited by examiner

*Primary Examiner*—Deborah Jones
*Assistant Examiner*—Jane Rhee
(74) *Attorney, Agent, or Firm*—Lawrence Isakoff; Jeffrey C. Lew

(57) ABSTRACT

An improved stitchbonded fabric has a pattern of stitches formed by a multi-needle stitched set of contractible stitching threads in a planar material that comprises a non-fibrous layer of polymer or metal, such as a metallic foil, a polymeric film, or a leather. Contraction of the stitchbonded fabric provides the fabric with unusual tactile, visual and functional effects.

5 Claims, No Drawings

STITCHBONDED FABRIC AND PROCESS FOR MAKING SAME

BACKGROUND OF THE INVENTION

1. Field of the Invention

This invention relates to a stitchbonded nonwoven fabric and a process for making such fabric. More particularly, the invention concerns the manufacture of an improved stitchbonded fabric in which the material that is multi-needle stitched, instead of being a conventional nonwoven fibrous sheet, comprises a layer of polymer or metal. The use of such metallic or polymeric layers provides the stitchbonded fabric with unusual visual, tactile and functional effects.

2. Description of the Prior Art

Stitchbonded nonwoven fabrics and processes and machines for making such fabrics are known. Typically, stitchbonded nonwoven fabrics are made by multi-needle stitching a fibrous material with one or more stitching thread systems. Typically, the material consists of substantially nonbonded fibers, although material consisting of bonded fibers also has been used. The stitching threads form patterns of stitches in the fibrous material. Many different kinds of fibrous materials have been employed to produce stitchbonded fabrics, including carded webs, thin felts, spunlace fabrics, spunbonded nonwoven sheets, paper and the like. These known fibrous layers are made from various natural and synthetic organic staple fibers or continuous filaments.

Known processes for making stitchbonded fabrics typically include the steps of (a) feeding a fibrous material to a stitchbonding machine; (b) threading a multi-needle bar of the stitchbonding machine with stitching threads; (c) inserting the stitching thread into the fibrous material to form a pattern of spaced apart, interconnected rows of stitches, thereby creating the stitchbonded fabric; (d) removing the stitchbonded fabric from the stitchbonding machine; and (e) optionally subjecting the stitchbonded fabric to further finishing operations, such as shrinking, heat setting, molding, coating, impregnating and the like.

Among the conventional stitching threads that have been employed in stitchbonding operations are yarns of natural fibers (e.g., cotton, wool); fibers or filaments of fully drawn, crystalline polymers (e.g., nylon, polyester); fibers of partially molecularly oriented synthetic organic polymer; and threads of spandex, or of other elastic or elastomeric materials. Use of elastic stitching thread, with or without an accompanying non-elastic thread, is disclosed in several patents. Similar use of stitching thread that is shrinkable also has been disclosed. For example, Zafiroglu, U.S. Pat. Nos. 4,876,128, 4,773,238, 4,737,394 and 4,704,321 disclose processes for making bulky and/or stretchy stitchbonded fabrics with various contractible and conventional threads. According to the processes disclosed in these patents, the stitchbonded fabric, upon removal from the multi-needle stitching operation, is allowed or caused to shrink and gather and undergo a significant reduction in fabric area.

To date, the character and appearance of known stitchbonded fabrics has depended mainly on the particular types of yarns, patterns of stitches formed by the stitching yarns, amount of shrinkage and other finishing steps used in the manufacture of the fabrics. Although the above-described stitchbonded nonwoven fabrics have been used successfully in a variety of products, fabrics with further surface interest, styling, tactile aesthetics and other functional characteristics are desired to enhance the utility of the fabrics . . . .

SUMMARY OF THE INVENTION

The present invention provides an improved stitchbonded nonwoven fabric. The fabric is of the type that comprises a material into which a pattern of multi-needle stitching had been inserted with a contractible stitching thread and then, the thusly formed stitchbonded fabric was contracted. The improvement of the invention comprises the material comprising a non-fibrous layer of polymer, metal or leather. Preferably the polymeric or metallic layer is a film, a coating or a foil. Typically, the stitched material, with its non-fibrous layer, contracts to a length and/or width that is 90% or less than the original length and/or width of the thin layer. Contractions to a length and/or width in the range of 50 to 75% of the original dimension are preferred. Preferably, the starting thickness of the non-fibrous layer is in the range of 0.05 and 3 mm. The non-fibrous layer may be united with a nonwoven fibrous sheet, a knitted fabric, a woven fabric, or a partially (surface) or fully resin-impregnated nonwoven fibrous sheet, to form a composite material into which the pattern of multi-needle stitches is inserted.

The invention also includes a process for making the new stitchbonded fabrics. The process is of the type that includes feeding a material to a stitchbonding machine having at least one multi-needle stitching bar, threading a needle bar with contractible stitching thread, inserting a pattern of stitches with the threaded multi-needle stitching bar into the material to form a stitchbonded nonwoven fabric and subsequently contracting the thusly formed stitchbonded fabric. According to the improvement of the process of the invention, the material comprises a non-fibrous layer of polymer, metal or leather or is a nonwoven fibrous sheet, knitted fabric, woven fabric, or a partially (surface) or fully resin-impregnated nonwoven fibrous sheet, which is coated, bonded or united with such a non-fibrous layer.

DETAILED DESCRIPTION OF PREFERRED EMBODIMENTS

The following detailed description of preferred embodiments of the invention is included for purposes of illustration and is not intended to limit the scope of the invention. The scope is defined by the claims appended below.

As used herein, the term material refers to the fibrous and non-fibrous layer or layers through which thread is multi-needle stitched in fabricating stitchbonded fabric. The term "shiny" refers to the light-reflective character of a surface of a layer of the material of the invention. The light reflective characteristic of the surface may also be referred to herein as "surface sheen". The term "fiber" includes within its meaning filaments and staple fibers. "Spandex" is a generic term for a manufactured fiber in which the fiber-forming substance is a long chain elastomer comprised of at least 85% segmented polyurethane.

The stitchbonded nonwoven fabric of the invention and its method of manufacture are in many ways quite similar to conventional stitchbonded nonwoven fabrics and known methods of their manufacture. As with several conventional stitchbonded fabrics, the fabric of the invention typically has a thin, supple material into which patterns of stitches are multi-needle inserted with at least one set of contractible stitching threads and the fabric is contracted after stitching.

In contrast to conventional stitchbonded fabrics and in accordance with the improvement of present invention, the material fed to the stitching operation comprises a metallic or polymeric foil or film or coating or a thin layer of leather. In some embodiments of the invention, a layer of such metallic or polymeric foil or film is supported on the surface of a thin fibrous material. Among the various thin fibrous materials upon which the metallic, polymeric or leather layer can be supported or attached are batts of carded fibers, air-laid fiber batts, wood-pulp papers, lightly bonded spun-bonded sheets, spunlace fabrics of hydraulically entangled fibers, non-bonded nonwoven sheets, lightweight woven or knitted fabrics, and the like. The fibers of the fibrous materials can be natural fibers or synthetic organic polymeric fibers, or combinations thereof. Usually, nonbonded fibrous layers are preferred, but lightly bonded or bonded fibrous materials can be employed as long as the bonding does not interfere with any subsequent contraction or other finishing operations to which the stitchbonded fabric may be subjected. Material comprising a foil of reflective metal is preferred for forming stitchbonded fabrics of the invention that have finished surfaces of unusual glitter and sheen. Such reflective metal foils are soft, malleable and readily pierced by stitching needles. Aluminum foil is particularly preferred.

Typical films suitable for use in the improved stitchbonded fabrics of the invention include films of polyethylene, polypropylene, polyester, polyether-based polyurethane, polyester-based polyurethane, and the like. Films of 0.05 to 3 mm thickness are satisfactory.

Substantially any elastic or shrinkable thread is suitable for the contractible stitching thread of the stitchbonded fabrics of the invention, provided the contractible thread exerts sufficient force to cause the material into which the contractible thread is stitched to contract and/or pucker after the multi-needle stitching operation. Among such threads are, for example, conventional yarns that can elongate and contract (e.g., bare or covered yarns of rubber or spandex, or textured stretch yarns) or yarns that can be made to shrink after stitching (e.g., (heat shrinkable yarns). A particularly suitable contractible stitching yarn is formed of spandex, which has high elongation and strong retractive power. Such yarn is commercially available (e.g., LYCRA® spandex manufactured by E. I. du Pont de Nemours and Co.). Such elastic contractible yarn is placed under tension when inserted into the material being multi-needle stitched, so that when the stitched material is removed from the multi-needle stitchbonding apparatus, the stitching thread contracts and causes the stitched material to contract and pucker.

In accordance with the invention, a wide variety of stitch patterns of the contractible stitching thread, and of other optional stitching threads, can be present in the stitchbonded fabric of the invention. As a result, the stitchbonded fabric has considerable versatility in use. The fabric can be caused to shrink by being immersed in a relaxed condition in boiling water, or by being heated in a relaxed condition in air. The shrinkage can decrease the length and/or width of the fabric to less than 50% of the as-stitched dimensions and the planar area to less than 25% of its as-stitched area, while significantly increasing the thickness of the fabric over its as-stitched thickness. However, linear dimension decreases as small as 10% produce satisfactory results in the stitchbonded fabrics having the non-fibrous layer of the invention. Decreases in the length and/or width in the range of 20 to 40% are usually preferred. After contraction, fabrics of the invention that contain elastic yarns are typically elastically stretchable. Also, after contraction, a stitchbonded fabric of the invention can be heat treated, while being held at fixed dimensions, to heat set (i.e., stabilize) the dimensions of the fabric.

As a result of the contraction step, the non-fibrous layer of the stitched material buckles out of plane between the fines of stitches and depending on the amount of shrinkage and, most importantly, on the type of non-fibrous layer employed provides the surface of the stitchbonded fabric of the invention with unusual and desirable characteristics. For example, when a non-fibrous layer of aluminum foil or a shiny film, is employed in producing stitchbonded fabric of the invention, an unusual glitter or sheen is imparted to the surface of the fabric. When a skiver of leather is employed as the non-fibrous layer of the stitched material, a smooth, non-textile-like hand (not unlike the tactile feel of a suede product) is imparted to the surface of the stitchbonded fabric.

The process for preparing the stitchbonded nonwoven fabric of the invention includes various known steps that can be performed with conventional equipment. The stitching step can be performed with a conventional multi-needle stitching machine equipped with one or more multi-needle bars. Malimo or Liba stitching machines are particularly useful. However, to obtain the advantageous characteristics of the fabric of the invention, the material that is being stitched must include a non-fibrous layer of polymer, metal or leather, and at least one of the patterns of stitches in the stitchbonded fabric must be formed with a contractible stitching thread.

Test Procedures

In the preceding description of the invention and in the examples below, certain measurements are mentioned. Unless indicated otherwise, these measurements were made by the procedures described in the next three paragraphs.

The weight per unit area of a stitchbonded fabric or of a fibrous starting material is measured according to ASTM Method D 3776-79. Break elongation of yarn is measured according to ASTM Method D 2256. The total thickness of a fabric is measured with a touch micrometer having a ¼-inch (0.64-cm) diameter flat cylindrical probe which applies a 10-gram load to the contacted surface of the fabric. The same method is used for measuring the thickness of a starting layer of foil, film or leather. The thickness of various layers within the stitchbonded fabric can be determined from magnified photomicrographs (e.g., at 15–20×) of the cross-section of the fabric.

Decreases in the linear dimensions of a stitchbonded fabric are measured in the longitudinal direction (i.e., parallel to the direction of the rows of stitches) and in the transverse direction (i.e., perpendicular to the longitudinal direction) of the stitchbonded fabric. The as-stitched dimensions (i.e., the initial length, $L_o$, and width, $W_o$, formed on the stitching machine) are measured and compared to the final dimensions (i.e., $L_f$ and $W_f$) of the fabric. The contraction, C, is then expressed as a % of the original dimension, as follows:

$C(\text{length})=100(L_o-L_f)/L_o$ $C(\text{width})=100(W_o-W_f)/W_o$ and $C(\text{area})=C(\text{length})\times C(\text{width})$ Stretch characteristics of a fabric are measured that on 20-cm-long by 2.5-cm-wide samples of the fabric. For longitudinal stretch measurements, the 20-cm length is parallel to the rows of stitches; for transverse stretch measurements, the 20-cm length is transverse to the rows of stitches. The sample is suspended between two 5-cm wide clamps that are set 10-cm apart (thereby providing a 10-cm long initial "gauge length", $L_i$). A 2-Kg weight is suspended from the lower clamp and the thusly formed assembly is hung for 5 minutes. The stretched gauge length, $L_f$, of the sample is measured. The % stretch is then equal to $100(L_f-L_i)/L_i$.

EXAMPLES

In the following examples, stitchbonded nonwoven fabrics of the invention are produced with various non-fibrous layers and contractible stitching threads. Non-fibrous layers of metal foil, polymeric film, leather, polymeric coating (on fabric) and coagulated polymer are illustrated. The stitchbonded fabric in each example is fabricated on a 144-inch (3.66-meter) wide, two-needle bar LIBA stitchbonding machine. Each needle bar is 14-gauge; that is, each bar has 14 needles per inch (5.5/cm). Both bars are employed in each example, except for Example 3, in which only one needle bar is employed. All bars are filly threaded, except for Examples 1 and 5 in which only every other needle is threaded (providing, in effect, 7-gauge needle bars). Conventional warp-knitting nomenclature is used to describe the repeating stitch patterns that are employed in preparing the fabric. After removal from the stitchbonding machine, each stitched fabric is heated in air at 60° C. or in boiling water and allowed to contract in length and width, Typically, a heat treatment of 2 to 3 minutes is sufficient for most of the aforementioned stitchbonded materials. However, longer heating times are sometimes required for stiff or heavy materials. During the stitching operation, the contractible stitching threads are inserted into the non-fibrous layer taut and under sufficient tension to assure that after the heat treatment, the desired contraction and bulkiness are obtained in the final product.

Example 1

A stitchbonded fabric of the invention is prepared by multi-needle stitching a shiny aluminum foil weighing 25 g/m$^2$ and having a thickness of 0.01 millimeter (0.0004 inch) with two bars of elastic yarn. The yarns are threaded at 7-gauge and insert 3.5 courses of stitches per centimeter (9/inch) along the length of the foil. The stitching thread is an elastic yarn of 70-denier (78-dtex) LYCRA® spandex (manufactured by E. I. du Pont de Nemours & Co.) wrapped with 40-den (44-dtex), 34-filament nylon yarn. The front bar forms a pattern of 1-0, 1-2 stitches and the back bar forms 2-1, 0-1 stitches. After the stitching operation, the resultant stitchbonded fabric is subjected to a hot-water heat-treatment and allowed to contract to 75% of its as-stitched length and 87% of its as-stitched width. The final fabric weights 106 $\mu$m$^2$, is elastic and exhibits, on its technical face, an attractive, non-uniform glitter and surface sheen. These characteristics make the fabric highly desirable for fashion shoes and accessories.

Example 2

A stitchbonded fabric of the invention is prepared by multi-needle stitching a polyurethane/polyester film of 60-g/m$^2$ unit weight and 0.1-mm (0.039 in) thickness Two filly threaded, 14-gauge needle bars insert 4.3 courses of stitches per cm (11/inch) along the length of the film. The front bar of the stitching machine is threaded with the same type of nylon-wrapped LYCRA® elastic yarn as in Example 1 and inserts a pattern of 1-0, 0-1, 1-2, 2-1 into the film. The back bar is threaded with a stitching thread of 70-denier (78-dtex), 34-filament textured polyester yam and makes a pattern of 1-0.1-2 stitches. The thusly stitched film is then is subjected to a hot-water heat-treatment and allowed to contract to 60% of its as-stitched length and to 95% of its as-stitched width. The heat-treated, contracted fabric weighs 288 g/m$^2$ and has a technical surface that exhibits attractive non-uniform light reflective and refractive characteristics. These characteristics make the fabric highly desirable for fashion apparel, shoes and accessories.

Example 3

A stitchbonded fabric of the invention is prepared by multi-needle stitching a 220-g/m$^2$, 0.4-mm thick layer of finished natural bovine leather. One fully threaded, 14-gauge needle bar of the stitchbonding machine is employed. As stitching thread, the same kind of nylon-covered LYCRA® elastic yarn as used in Example 1 is employed to insert a pattern of 1-0, 2-3 stitches and to form 3.5 courses of stitches per centimeter (9/inch) along the length of the leather. After removal from the stitching machine, the stitched leather fabric is heat-treated and allowed to shrink to 80% of its as-stitched length and width. The resultant stitched and contracted fabric weighs 260 g/m$^2$, is about 2.3-mm thick, is soft and pliable, has a longitudinal elongation of about 10–15%, and has an attractive variable sheen

Example 4

A stitchbonded fabric of the invention is prepared by multi-needle stitching a 0.12-mm-thick non-fibrous layer of a polyurethane-based resin formulation supported as a 40-g/m$^2$ coating (formed by conventional transfer coating techniques) on a nonwoven sheet of 100% polyester fibers. Both 14-gauge needle bars of the stitchbonding machine are fully threaded and insert 5.6 courses of stitches per cm (14/inch) along the length of the coated fabric. The front bar of the stitching machine is threaded with the same type of nylon-wrapped LYCRA® elastic yarn as in Example 1 and inserts a pattern of 0-0, 2-2 stitches. The back bar is threaded with 70-denier (78-dtex), 34-filament textured nylon yarn and makes a pattern of 1-0, 0-1, 1-2, 2-1 stitches. Upon removal from the stitchbonding machine, the fabric weighs 194 g/m$^2$ (5.7 oz/yd$^2$). Heat treatment of the stitched fabric results in contraction to 60% of its as-stitched length and to 80% of its as-stitched width and to an increase in fabric thickness. The final fabric weighs 391 g/m$^2$ (11.5 oz/yd$^2$) and is a bulky warm fabric that has a non-uniform color interference effect, a rippled surface texture and a coolness to touch. The final bulked fabric is very attractive for fashion outerwear apparel.

Example 5

A stitchbonded fabric of the invention is prepared by multi-needle stitching a 0.8-mm-thick polyester warp-knitted fabric having a polyurethane-based resin coagulated on the surface of the knitted fabric. The polyurethane surface is sueded to provide an artificial leather-like material. The material has a total unit weight of about 280 g/m$^2$, of which 50% is the polyurethane resin and 50% is the knitted fabric. The artificial leather-like material is fed to the stitchbonding machine. Every other needle of both needle bars of the machine are threaded (i.e., 7 gauge) with the same nylon-covered LYCRA® elastic yarn as employed in Example 1. The needle bars insert 3.5 courses of stitches per centimeter (9/inch) along the length of the knitted fabric with its coagulated elastomeric layer. The front and back bars respectively inserted 1-0, 1-2 and 1-2, 1-0 stitches. After stitching and heat treatment, the stitched layer contracts to 55% of its as-stitched length and 80% of its as-stitched width. The final fabric weighs 646 g/m$^2$ and is 1.9-min thick. The fabric has a rough surface that reflects and refracts light non-uniformly and has satisfactory functional characteristics (e.g., abrasion and compression resistance) that make it particular attractive for shoes, handbags, luggage and the like.

Example 6

A multi-layered stitchbonded fabric of the invention is prepared by multi-needle stitching a 0.03-mm-thick non-fibrous layer of a polyester-based polyurethane film together with a spunbonded fibrous nonwoven sheet of flash-spun polyethylene plexifilaments (TYVEK® manufactured by E.I. du Pont de Nemours & Co.). Only the front bar of the stitchbonding is employed. The bar is threaded at 7-gauge with 280-denier (320-dtex) LYCRA® spandex wrapped with 70-den (78-dtex) 34-filament polyester yarn and inserts 2.7 stitches per cm (7/in) in a 1-0, 0-1 pattern, along the length of the multi-layer assembly. After the stitching operation the resulting stitchbonded fabric is heat-treated at a temperature in the range of about 88 to 100° C. with radiant heat and allowed to contract to 33% of its as-stitched length and 98% of its as-stitched width. The contracted fabric weighs 271 g/m$^2$, is elastic, and has a surface sheen. The fabric of this example particularly suited for use in industrial/construction applications, as well as in fashion apparel, shoes and accessories.

Example 7

A stitchbonded fabric of the invention is prepared by multi-needle stitching a layer of "bubble-wrap" packaging and cushioning material. The material is a polypropylene film having substantially spherical, air-filled bubbles of approximately ½-cm radius. The bubbles are spaced 1.1-cm apart, center-to-center, in an equilateral triangular array. The solid portions of the film are about 0.06-mm thick. The average unit weight of the film is about 47 g/m$^2$. Both 14-gauge needle bars of the stitchbonding machine are fully threaded and insert 4.3 courses per cm (1/inch) along the length of the bubble wrap layer, with the same stitching yarns and stitch patterns as employed in Example 2. The thusly stitchbonded layer is then heat treated and allowed to contract to about 85% of its original planar area. The resultant fabric has a random three-dimensional appearance, regions of differing density and areas of the surface of high and low reflectivity. The visual effect is most unusual and attractive for apparel and other fashion uses.

We claim:

1. A stitchbonded fabric having a pattern of stitches formed by a multi-needle stitched set of stitching threads in a material, characterized in that the material comprises a non-fibrous layer of polymer or metal and at least one set of stitching threads comprises a contractible yarn, said yarn having contracted the material to a length and/or width that is no greater than 90 percent of the original length and/or width of the material and said yarn comprising an elastic filament, a partially oriented synthetic organic polymeric fiber or a textured yarn.

2. A stitchbonded fabric in accordance with claim 1 wherein the non-fibrous layer is a polymeric film.

3. A stitchbonded fabric in accordance with claim 1 wherein the non-fibrous layer is a metal foil.

4. A stitchbonded fabric in accordance with claim 1 wherein the non-fibrous layer consists essentially of a polymeric coating and the coating is supported on a fibrous layer.

5. A stitchbonded fabric in accordance with claim 1 wherein the yarn contracted the material to a length and/or width that is in the range of 75 to 50 percent of the original length and/or width of the material.

* * * * *